US 11,441,502 B2

(12) United States Patent
Andersson

(10) Patent No.: US 11,441,502 B2
(45) Date of Patent: Sep. 13, 2022

(54) START-UP METHOD FOR A VEHICLE WITH A HYBRID PROPULSION SYSTEM

(71) Applicant: VOLVO TRUCK CORPORATION, Gothenburg (SE)

(72) Inventor: Lennart Andersson, Varberg (SE)

(73) Assignee: VOLVO TRUCK CORPORATION, Gothenburg (SE)

( * ) Notice: Subject to any disclaimer, the term of this patent is extended or adjusted under 35 U.S.C. 154(b) by 0 days.

(21) Appl. No.: 16/956,729

(22) PCT Filed: Dec. 29, 2017

(86) PCT No.: PCT/EP2017/084844
§ 371 (c)(1),
(2) Date: Jun. 22, 2020

(87) PCT Pub. No.: WO2019/129369
PCT Pub. Date: Jul. 4, 2019

(65) Prior Publication Data
US 2020/0332730 A1    Oct. 22, 2020

(51) Int. Cl.
*F02D 41/02* (2006.01)
*F02M 26/05* (2016.01)
(Continued)

(52) U.S. Cl.
CPC ....... *F02D 41/0255* (2013.01); *B01D 53/944* (2013.01); *B01D 53/9418* (2013.01);
(Continued)

(58) Field of Classification Search
CPC ............... F02D 41/0255; F02D 41/062; F02D 41/0007; F02D 33/006; F02D 41/0055;
(Continued)

(56) References Cited

U.S. PATENT DOCUMENTS

| 7,818,959 | B2 | 10/2010 | Hu et al. |
| 2010/0126142 | A1 | 5/2010 | Murata et al. |

(Continued)

FOREIGN PATENT DOCUMENTS

| CN | 101516705 A | 8/2009 |
| CN | 105102289 A | 11/2015 |

(Continued)

OTHER PUBLICATIONS

International Search Report and Written Opinion dated Sep. 11, 2018, in corresponding International PCT Application No. PCT/EP2017/084844, 14 pages.
(Continued)

*Primary Examiner* — Audrey B. Walter
(74) *Attorney, Agent, or Firm* — Venable LLP; Jeffri A. Kaminski

(57) ABSTRACT

A start-up method for heating a selective catalytic reduction (SCR) module in a hybrid propulsion system of a vehicle. An internal combustion engine is in fluid communication with an exhaust aftertreatment system having an exhaust. An SCR module is disposed in the exhaust passage downstream of the engine and an electric motor. The method includes operating the engine in a start-up mode with a torque restriction on the engine, allowing the SCR module to convert NOx emission; supplying a surplus amount of a reducing agent to the exhaust gas at a position between the engine and the SCR module, the surplus amount of the reducing agent being larger than a required amount of reducing agent for converting NOx emission from the engine; heating said SCR module to a working temperature; and terminating the start-up mode.

14 Claims, 5 Drawing Sheets

(51) Int. Cl.
| | |
|---|---|
| F02M 26/06 | (2016.01) |
| F02M 26/07 | (2016.01) |
| F02M 26/22 | (2016.01) |
| B01D 53/94 | (2006.01) |
| B01J 23/22 | (2006.01) |
| B01J 29/04 | (2006.01) |
| B60K 6/24 | (2007.10) |
| B60K 6/26 | (2007.10) |
| F01N 3/035 | (2006.01) |
| F01N 3/08 | (2006.01) |
| F01N 3/10 | (2006.01) |
| F01N 3/20 | (2006.01) |
| F01N 3/28 | (2006.01) |
| F02D 33/00 | (2006.01) |
| F02D 41/00 | (2006.01) |
| F02D 41/06 | (2006.01) |
| F01N 13/00 | (2010.01) |
| F02B 37/00 | (2006.01) |

(52) U.S. Cl.
CPC .......... *B01D 53/9477* (2013.01); *B01J 23/22* (2013.01); *B01J 29/04* (2013.01); *B60K 6/24* (2013.01); *B60K 6/26* (2013.01); *F01N 3/035* (2013.01); *F01N 3/0842* (2013.01); *F01N 3/103* (2013.01); *F01N 3/2006* (2013.01); *F01N 3/208* (2013.01); *F01N 3/2066* (2013.01); *F01N 3/2882* (2013.01); *F01N 13/0093* (2014.06); *F02D 33/006* (2013.01); *F02D 41/0007* (2013.01); *F02D 41/0055* (2013.01); *F02D 41/062* (2013.01); *F02D 41/068* (2013.01); *F02M 26/05* (2016.02); *F02M 26/06* (2016.02); *F02M 26/07* (2016.02); *F02M 26/22* (2016.02); *B01D 2255/20723* (2013.01); *B01D 2255/20761* (2013.01); *B01D 2255/50* (2013.01); *F01N 2370/04* (2013.01); *F01N 2510/06* (2013.01); *F01N 2590/11* (2013.01); *F01N 2610/02* (2013.01); *F01N 2610/1453* (2013.01); *F01N 2900/1602* (2013.01); *F01N 2900/1806* (2013.01); *F02B 37/00* (2013.01); *F02D 2250/26* (2013.01); *F02D 2250/36* (2013.01)

(58) Field of Classification Search
CPC .............. F02D 41/068; F02D 2250/26; F02D 2250/36; F01N 3/208; F01N 13/0093; F01N 3/035; F01N 3/0842; F01N 3/103; F01N 3/2006; F01N 3/2066; F01N 3/2882; F01N 2590/11; F01N 2900/1602; F01N 2900/1806; F01N 2370/04; F01N 2510/06; F01N 2610/02; F01N 2610/1453; F02M 26/05; F02M 26/06; F02M 26/07; F02M 26/22; B01D 53/9418; B01D 53/944; B01D 53/9477; B01D 2255/20723; B01D 2255/20761; B01D 2255/50; B01J 23/22; B01J 29/04; B60K 6/24; B60K 6/26; F02B 37/00
See application file for complete search history.

(56) References Cited

U.S. PATENT DOCUMENTS

| | | | |
|---|---|---|---|
| 2010/0180580 A1* | 7/2010 | Boorse | ................ F01N 3/2066 60/297 |
| 2010/0251996 A1 | 10/2010 | Akimoto | |
| 2011/0146268 A1 | 6/2011 | Hepburn et al. | |
| 2014/0000242 A1 | 1/2014 | Hepburn et al. | |
| 2014/0013726 A1* | 1/2014 | Yacoub | ................ F01N 3/2066 60/274 |
| 2015/0128576 A1 | 5/2015 | Osumi | |
| 2016/0297424 A1 | 10/2016 | Park et al. | |
| 2017/0044948 A1 | 2/2017 | Caine et al. | |
| 2019/0118793 A1* | 4/2019 | Jang | ..................... B60W 10/06 |
| 2019/0345861 A1* | 11/2019 | Johansson | ............... F01N 3/206 |

FOREIGN PATENT DOCUMENTS

| | | |
|---|---|---|
| CN | 106043288 A | 10/2016 |
| DE | 102012019947 A1 | 4/2014 |
| JP | 2017193245 A | 10/2017 |
| WO | 2014188875 A1 | 11/2014 |
| WO | 2015130212 A1 | 9/2015 |

OTHER PUBLICATIONS

Junfeng Zhao & Junmin Wang, Model Predictive Control of Integrated Hybrid Electric Powertrains Coupled With Aftertreatment Systems, Proceedings of the ASME 2014 Dynamic Systems and Control Conference, Oct. 22-24, 2014, pp. 1-6, Retrieved from http://proceedings.asmedigitalcollection.asme.org/ on Jan. 31, 2016.
China Office Action dated Jun. 29, 2021 in corresponding China Patent Application No. 201780097979.0, 21 pages.

* cited by examiner

START-UP METHOD FOR A VEHICLE WITH A HYBRID PROPULSION SYSTEM

CROSS-REFERENCE TO RELATED APPLICATIONS

This application is a U.S. National Stage application of PCT/EP2017/084844, filed Dec. 29, 2017, and published on Jul. 4, 2019, as WO 2019/129369 A1, all of which is hereby incorporated by reference in its entirety.

TECHNICAL FIELD

The present invention relates to a start-up method for heating a selective catalytic reduction (SCR) module in a hybrid propulsion system of a vehicle. Furthermore, the invention relates to a control unit configured for performing a start-up method for heating a selective catalytic reduction (SCR) module in a hybrid propulsion system of a vehicle. Moreover, the invention relates to a vehicle comprising a control unit configured for performing a start-up method for heating a selective catalytic reduction (SCR) module in a hybrid propulsion system of the vehicle. The invention also relates to an exhaust aftertreatment system for receiving an exhaust gas.

The invention can be applied in heavy-duty vehicles, such as trucks, buses and construction equipment. Although the invention will be described in relation to a truck, the invention is not restricted to this particular vehicle, but may also be used in other type of vehicles such as cars, buses, construction equipment, industrial construction machines, wheel loaders, etc.

BACKGROUND

Engines, in particular diesel-powered combustion engines but also other engines known in the art, produce exhaust gases which contain several air pollutants, including carbon monoxide (CO), hydrocarbons (HC), nitrogen oxides NO and NO2 (NOx) as well as particulate matter (PM) containing carbonaceous matter, or soot.

However, current regulatory conditions in the automotive market have led to an increasing demand to improve fuel economy and reduce emissions in present vehicles. Further, with increased attention to environmental problems and health hazard prevention, exhaust emission regulations are becoming more and more stringent. These regulatory conditions must be balanced with the demands of high performance and quick response for a vehicle.

Accordingly, reducing the oxides of nitrogen (NO and NO2, referred to as NOx) and particulate matter (PM) in exhaust gases from a diesel engine has become a problem in view of the protection of environment and the saving of finite fossil energy supply. Vehicles equipped with diesel or other lean burn engines offer the benefit of increased fuel economy, however, catalytic reduction of NOx emissions via conventional means in such systems is difficult due to the high content of oxygen in the exhaust gas.

To reduce the amount of NOx in the exhaust gases, some engines are equipped with Selective Catalytic Reduction (SCR) systems that convert a mixture of NOx and ammonia (NH3) into nitrogen gas (N2) and water (H2O).

In order to ensure that the catalyst process in these types of system can be performed in an efficient manner, it is generally required to provide a sufficiently high operating temperature of the system. However, providing a sufficiently high operating temperature may sometimes be a challenge to guarantee in certain environments.

In particular, there is typically a challenge to provide a sufficiently high operating temperature of the system at cold starts of the vehicle. Thus, some systems may perform a so called warm-up control. For example, US 2010/0126142 A1 discloses a control method of an internal combustion engine exhaust gas control system applied to a hybrid vehicle. The control method includes calculating a target injection quantity of fuel needed to raise the temperature of exhaust gas flowing into the exhaust gas control catalyst to a target exhaust gas temperature when it is determined that warm-up control of the internal combustion engine is to be executed.

Despite the activity in the field, there remains a need to further improve the process of reducing the amount of NOx in the exhaust gases at cold starts and restarts of a vehicle comprising a hybrid propulsion system.

Another problem with current systems is the physical size of the system and the limited space available in modern vehicles, rendering packaging of e.g. the exhaust aftertreatment system difficult.

Thus, it would be beneficial if it could be ensured that the system can be installed in various types of vehicles without substantial changes to the exhaust aftertreatment system of the vehicles.

SUMMARY

It is an object of the present invention to provide an improved start-up method for heating a selective catalytic reduction (SCR) module of a vehicle, which is capable of reducing the time required for heating the SCR module to a sufficiently high operating temperature, thus enabling a quicker activation of the process for reducing the amount of NOx in the exhaust gases. The object is at least partly achieved by a method according to claim 1.

According to a first aspect of the present invention, there is provided a start-up method for heating a selective catalytic reduction (SCR) module in a hybrid propulsion system of a vehicle.

The system comprises an electric motor operatively connected to an internal combustion engine producing exhaust gas. The electric motor and internal combustion engine are operable to power the vehicle. The engine is also in fluid communication with an exhaust aftertreatment system (EATS) having an exhaust passage. The EATS comprises the SCR module. In addition, the SCR module is disposed in the exhaust passage downstream of the engine and the electric motor.

The method comprises the steps of:
  operating the engine in a start-up mode with a torque restriction on the engine, allowing the SCR module to convert NOx emission;
  supplying a surplus amount of a reducing agent to the exhaust gas at a position between the engine and the SCR module, the surplus amount of the reducing agent being larger than a required amount of reducing agent for converting NOx emission from the engine;
  heating the SCR module to a working temperature T1;
  terminating the start-up mode, thereby terminating the torque restriction on the engine and the supply of the surplus amount of the reducing agent.

By the example embodiments of the method, as mentioned above, it becomes possible to reduce the high NOx emissions at cold starts or re-starts of a hybrid propulsion system including the internal combustion engine and the electrical motor. In particular, the operational steps of method, as mentioned above, contribute to reduce the high NOx emissions at re-starts of the internal combustion engine after electric drive with the electrical motor.

By the provision of operating the engine in the start-up mode with the torque restriction on the engine, the engine is operated in a fuel efficient mode compared a normal operational engine mode, thus permitting the system to produce a lower amount of NOx in the exhaust gas and a lower exhaust flow while the SCR module or additional SCR modules are heated. In that manner, the parts which have been heated are enough warm to convert NOx.

By the provision of supplying a surplus amount of a reducing agent to the exhaust gas at a position between the engine and the SCR module, it becomes possible to provide a high NOx conversion and to increase the chances of having enough reductant (reducing agent) in any geometry of the SCR module inlet. Typically, excess reductant will be adsorbed and stored in the corresponding SCR module catalyst.

Accordingly, when the SCR module is heated to the working temperature, it is believed that the SCR module is sufficiently warm to operate in an efficient manner in terms of reducing the amount of NOx in the exhaust gases. Thus, the start-up mode of the hybrid propulsion system is terminated by terminating the torque restriction on the engine and the supply of the surplus amount of the reducing agent. Otherwise, the system may be operated in a less efficient manner, e.g. causing unnecessary load on the battery capacity in a hybrid vehicle, or delimiting the acceleration and velocity in a vehicle without batteries.

As will be further described hereinafter, the example embodiments of the invention can be installed and used in any type of vehicle such as heavy-duty vehicles, e.g. trucks, buses and construction equipment.

The example embodiments of the method can be installed in several different types of hybrid propulsion system. In particular, the example embodiments of the method can be installed in a hybrid propulsion system having an exhaust aftertreatment system for reducing NOx and comprising a first SCR catalyst, a second SCR catalyst and a turbocharger arranged in-between, as will be further described below. However, the method may likewise be useful in a hybrid propulsion system having an exhaust aftertreatment system for reducing NOx and comprising one SCR catalyst, only.

It is to be noted that the working temperature T1 may correspond to a temperature of about 170-500 degrees Celsius, still preferably the working temperature T1 may correspond to a temperature of about 170-400 degrees, still preferably the working temperature T1 may correspond to a temperature of about 250-400 degrees Celsius. Also, in some example embodiments, the working temperature T1 may correspond to a temperature of about 250-500 degrees Celsius. Thus, the step of heating the SCR module to the working temperature T1, may include the step of heating the SCR module to about 170-500 degrees Celsius, or to any other one of the ranges mentioned above.

Typically, although not strictly required, the method further comprise the step of performing a high pressure exhaust gas recirculation (EGR) of exhaust gases transported in the exhaust passage downstream of the engine. In this manner, the engine is operated in an even more fuel efficient mode compared a normal operational engine mode, thus permitting the system to produce an even lower amount of NOx and a lower exhaust flow. A lower amount of NOx during the early heat-up (e.g. heating of a DOC and the first SCR module) means a low emission.

Further, in this example embodiment, the step of terminating the start-up mode, thereby terminating the torque restriction on the engine and the supply of the surplus amount of the reducing agent, further comprises the step of terminating the high pressure EGR.

The term "exhaust gas recirculation" typically refers to a nitrogen oxide (NOx) emissions reduction technique used in e.g. diesel engines. EGR works by recirculating a portion of an engine's exhaust gas back to the engine cylinders.

According to one example embodiment, the step of terminating the start-up mode further comprises the step of switching from the high pressure EGR to a low pressure EGR, while changing from supplying the surplus amount of the reducing agent to the required amount of reducing agent for converting NOx emission from the engine. In this manner, it becomes possible to further improve the efficiency of reducing the NOx emissions with more optimal fuel efficiency.

By way of example, the step of switching from the high pressure EGR to the low pressure EGR is performed by directing at least a portion of exhaust gases in the exhaust passage via the low pressure EGR. Typically, a high pressure EGR requires (in the sped-torque area with best fuel efficiency) a throttle or a variable turbine (both reducing the efficiency) due to that with a high efficient turbo, the pressure in the intake is higher than the exhaust pressure before turbine. The low pressure EGR has typically a positive driving pressure due to the backpressure of the SCR module in the exhaust passage and the backpressure of the intake air filter. The reduced NOx results in lower cost of reductant, and typically also a smaller dimensioned SCR module.

According to one example embodiment, the step of operating the engine with the torque restriction comprises the step of providing additional power by the electric motor if the amount of power from the engine operated with the torque restriction is less than the required amount of power for operating the vehicle. One advantage with using the electric motor to provide the extra power, as mentioned above, is that the method can reduce the risk of having too high exhaust flow by having a too high power demand from the engine.

Typically, although not strictly required, the step of operating the engine with the torque restriction is performed by controlling the flow of fuel to the engine. By way of example, the step of operating the engine with the torque restriction is performed by controlling the flow of fuel to the engine by means of a valve member.

According to one example embodiment, the step of supplying the surplus amount of the reducing agent to the exhaust gas at the position between the engine and the SCR module is performed by an injector.

The EATS can be provided in several different configurations. In one example embodiment, the EATS comprises a diesel oxygen catalyst (DOC) and an additional SCR module having a SCR catalyst coated on a diesel particulate filter (DPF). Typically, the DOC is arranged upstream of the additional SCR module and in fluid communication with each other by a reductant mixing chamber (RMC). By having the SCR catalyst coated on the DPF, the SCR catalyst is capable of heating up more rapidly compared to the SCR catalyst downstream of the DPF, while keeping $NO_2$ available to combust soot in the DPF. $NO_2$ is formed in the DOC ($2NO+O_2 \rightarrow 2NO_2$) and reacts with soot ($2NO_2+C \rightarrow 2NO+CO_2$)). By arranging the first SCR module upstream of the DPF, no soot is combusted.

Moreover, by having the RMC arranged in-between the DOC and the additional SCR module, there is provided space/time for evaporating and mixing the reductant.

According to one example embodiment, the surplus amount of the reducing agent supplied in step of supplying the surplus amount of the reducing agent to the exhaust gas at a position between the engine and the SCR module is larger than a normal amount of reducing agent supplied to the SCR module.

According to one example embodiment, the system further comprises a turbocharger disposed in the exhaust passage and downstream of the SCR module and upstream of the SCR module. Thereby, the SCR module is a pre-turbo SCR module and the additional SCR module is a post-turbo SCR module.

Typically, the step of heating the SCR module (pre-turbo SCR module) to a working temperature, also includes the step of heating the additional SCR module (post-turbo SCR module) to a corresponding working temperature.

Thus, according to one example embodiment, the step of heating the SCR module (pre-turbo SCR module) to the working temperature T1 further comprises heating the post-turbo SCR module to a corresponding working temperature.

In brief, the turbocharger is adapted to lower the temperature of the exhaust gases passing through the turbocharger by reducing the level of energy of the exhaust gases.

In addition, by arranging the EATS in close connection with the internal combustion engine, in particular, by arranging the pre-turbo SCR module in close connection with the engine, it becomes possible to more rapidly heat the pre-turbo SCR module to its working temperature when the engine is started (or re-started). Further, by arranging the pre-turbo SCR module upstream of the turbine of the turbocharger, it becomes possible to utilize the temperature from the engine prior to the decrease of the temperature of the exhaust gases that occurs when the exhaust gases passing through the turbine.

Moreover, by arranging the post-turbo SCR module downstream of the turbocharger, it becomes possible to facilitate the process of reducing the NOx emissions in the exhaust gases, which is particularly useful when the engine is operated at high loads, thus producing exhaust gases with a higher temperature. This configuration of the system is advantageously because in some occasions the pre-turbo SCR module position is too hot for providing a full conversion of NOx, while the post-turbo SCR module in corresponding occasions is in an optimal temperature.

By way of example, the SCR catalyst in the pre-turbo SCR module is a CU-zeolite-based catalyst and an SCR catalyst in the post-turbo SCR module is a vanadia-based catalyst. Typically, this is an advantage because the CU-zeolite-based catalyst withstands high temperatures in a better way, which can occur in a pre-turbo position. The vanadia-based catalyst may not withstand high temperatures in the same manner, but may also not need to be regenerated as frequent as the pre-turbo SCR module.

The SCR modules as mentioned above are typically manufactured from various ceramic materials used as a carrier, such as titanium oxide. The SCR catalysts, i.e. the active catalytic components, are usually either oxides of base metals (such as vanadium, molybdenum and tungsten), zeolites, or various precious metals.

It is to be noted that each one of the SCR module may be a honeycomb structure. The honeycomb form is generally an extruded ceramic applied homogeneously throughout the ceramic carrier or coated on the substrate.

According to one example embodiment, the SCR catalyst may be coated onto a wall surface of the honeycomb structure.

According to one example embodiment, the SCR catalyst may be a part of the honeycomb structure.

Another common design of the SCR catalyst geometry is a plate type. Plate-type SCR catalysts have lower pressure drops and are less susceptible to plugging and fouling than the honeycomb types, but plate configurations are much larger and more expensive. Honeycomb configurations are smaller than plate types, but have higher pressure drops and plug much more easily.

It is to be noted that any one of the SCR catalysts may be a zeolite-based catalyst or vanadia-based catalyst.

The vanadia-based (e.g. $V_2O_5/TiO_2$) catalyst is advantageous because this type of catalyst does not require $NO_2$ for efficient selective catalytic reduction of NOx emissions. There is essentially no $NO_2$ available in the exhaust gas directly after the engine or turbocharger outlet port. Furthermore, in the case of misfuelling with high-sulphur fuel (e.g. >300 ppm S), some zeolite-based SCR catalysts require elevated temperatures, e.g. 600 degrees C., for removal of adsorbed sulphur species to regain the SCR catalyst performance.

A vanadia-based SCR catalyst is generally sulphur tolerant and does not require elevated temperatures for removal of adsorbed sulphur species.

The zeolite-based catalyst is advantageous because of its wide active temperature window, good heat-resistance and effective NOx reduction.

According to one example embodiment, the step of performing the high pressure EGR is performed on exhaust gases in the exhaust passage upstream of the DOC.

According to one example embodiment, the EATS comprises a low pressure EGR line in fluid communication with the exhaust passage at a position downstream of the turbocharger. By way of example, the low pressure EGR line comprises an EGR cooler and an EGR line SCR catalyst. As mentioned above, the low pressure EGR has typically a positive driving pressure due to the backpressure of the SCR module in the exhaust passage and the backpressure of the intake air filter. The reduced NOx results in lower cost of reductant, and typically also a smaller dimensioned SCR module.

According to one example embodiment, the method further comprises the step of supplying an additional amount of reducing agent to the exhaust gas in the exhaust passage at a position between the low pressure EGR line and the additional SCR module (the post-turbo SCR module). This step of the method is advantageously because at the highest temperatures, the reductant is consumed not only by converting NOx ($4NH_3+4NO+O_2 \rightarrow 4N_2+6H_2O$), but also by oxygen ($4NH_3+3O_2 \rightarrow 2NO+6H_2O$). Thus there will be no reductant downstream to convert the remaining NO in the downstream post-turbo SCR module. Further, it has been observed that continues exposure of reductant through the turbine and the low pressure EGR may harm components such as turbine, cooler and compressor. Typically, the step of supplying the additional amount of reducing agent to the exhaust gas in the exhaust passage at the position between the low pressure EGR line and the additional SCR module (the post-turbo SCR module) is performed by an additional injector.

The low pressure EGR line and the injector may be arranged adjacent a turbine of the turbocharger. That is, the low pressure EGR line and the injector can be placed so near the turbine outlet as possible to use the turbulence from the turbine outlet as mixing volume or a mixing volume is placed near the catalyst.

In one example embodiment, when the engine is operated in the start-up mode, the SCR module is operated to convert more than 95% of the NOx emission, preferably more than 98% of the NOx emission, still preferably more than 99% of the NOx emission.

According to a second aspect of the present invention, there is provided a control unit for a vehicle configured to perform any one of the steps of the method according to any one of the example embodiments and/or the features as described above in relation to the first aspect of the present invention.

It should be noted that the control unit may include a microprocessor, microcontroller, programmable digital signal processor or another programmable device. The control unit may also, or instead, include an application specific integrated circuit, a programmable gate array or programmable array logic, a programmable logic device, or a digital signal processor. Where the control unit includes a programmable device such as the microprocessor, microcontroller or programmable digital signal processor mentioned above, the processor may further include computer executable code that controls operation of the programmable device.

Effects and features of the second aspect are largely analogous to those described above in relation to the first aspect of the present invention.

According to a third aspect of the present invention, there is provided an internal combustion engine which comprises a control unit for controlling the internal combustion engine. The control unit is configured to perform the steps of the method according to any one of the example embodiments and/or the features as described above in relation to the first aspect and the second aspect of the present invention.

Effects and features of the third aspect are largely analogous to those described above in relation to the first aspect and the second aspect of the present invention.

According to a fourth aspect of the present invention, there is provided a vehicle comprising an internal combustion engine and a control unit as described above in relation to the second aspect of the present invention.

According to a fifth aspect of the present invention, there is provided a computer program comprising program code means for performing the steps described above in relation to the first aspect of the present invention when the program is run on a computer.

According to a sixth aspect of the present invention, there is provided a computer readable medium carrying a computer program comprising program means for performing the steps described above in relation to the first aspect of the present invention when the program means is run on a computer.

Effects and features of the fourth, fifth and sixth aspects are largely analogous to those described above in relation to the first aspect, the second aspect and the third aspect of the present invention.

According to a seventh aspect of the present invention, there is provided an exhaust aftertreatment system for a vehicle comprising: a turbine disposed in an exhaust passage, a pre-turbo selective catalytic reduction SCR module comprising a CU-zeolite-based catalyst, and being arranged upstream of the turbine in the exhaust passage; and a post-turbo SCR module comprising a vanadia-based catalyst, and being arranged downstream of the turbine in the exhaust passage; whereby the turbine is arranged to reduce exhaust enthalpy in the exhaust passage.

One advantage with this example embodiment of the EATS is that the system provides enhanced fuel efficiency. For instance, during normal engine operation, the CU-zeolite-based catalyst arranged in the pre-turbo position can be regenerated without need of extra heating of exhaust.

Additional effects and features of the seventh aspect is largely analogous to those described above in relation to the other aspects of the present invention.

According to one example embodiment, the CU-zeolite-based catalyst of the pre-turbo SCR module is coated on a diesel particulate filter DPF.

It is also to be noted that the method of the example embodiments can further operate a hybrid propulsion system according to any one of the above example embodiments when the DOC, the RCM, the injector, the SCR module, the SCR catalyst and the DPF are disposed downstream of the turbocharger including the turbine. In addition, in this type of system the DPF is typically a separate component in fluid communication with the SCR module comprising the SCR catalyst.

Further features of, and advantages with, the present invention will become apparent when studying the appended claims and the following description. The skilled person realize that different features of the present invention may be combined to create embodiments other than those described in the following, without departing from the scope of the present invention.

BRIEF DESCRIPTION OF THE DRAWINGS

The above, as well as additional objects, features and advantages of the present invention, will be better understood through the following illustrative and non-limiting detailed description of exemplary embodiments of the present invention, wherein.

Figure 1:
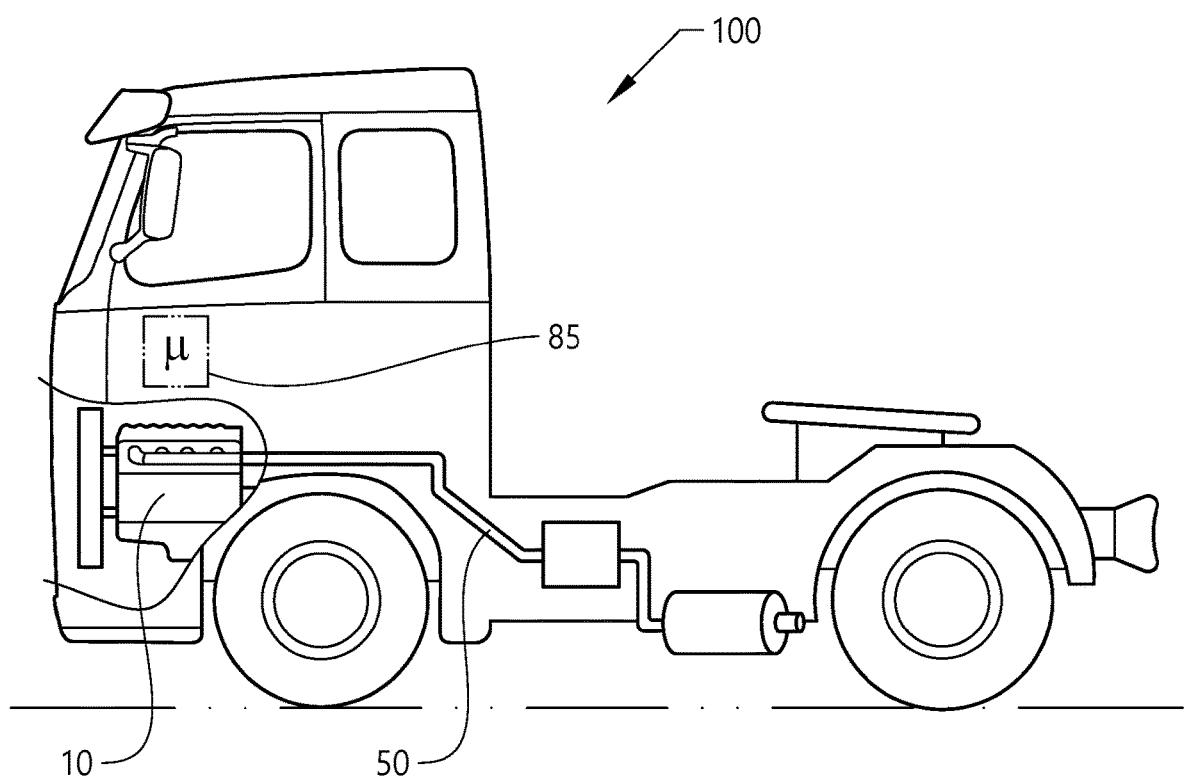
FIG. 1 is a side view of a vehicle in the form of a truck comprising a hybrid propulsion system adapted to be operated according to a method of an example embodiment of the present invention.

With reference to the appended drawings, below follows a more detailed description of embodiments of the invention cited as examples.

DETAILED DESCRIPTION OF EXAMPLE EMBODIMENTS OF THE INVENTION

The present invention will now be described more fully hereinafter with reference to the accompanying drawings, in which exemplary embodiments of the invention are shown. The invention may, however, be embodied in many different forms and should not be construed as limited to the embodiment set forth herein; rather, these embodiments are provided for thoroughness and completeness. Like reference character refer to like elements throughout the description.

Referring now to the drawings and to FIG. 1 in particular, there is depicted a vehicle 100 including a hybrid propulsion system 50 according to an example embodiment of the present invention. The vehicle 100 illustrated in FIG. 1 further includes an internal combustion engine 10 producing an exhaust gas and generally an exhaust aftertreatment system (EATS), that may include several different types of components, as described below. The vehicle 100 in FIG. 1 is provided in the form of a truck. Typically, the hybrid propulsion system 50 comprises the internal combustion engine 10 and the EATS. The EATS in this example is utilized for an internal combustion engine of the diesel type. Accordingly to the example embodiment of the present invention, the diesel engine is intended for use in a truck. The diesel engine may for instance include six cylinders (not shown). The invention is however not limited to any specific number of cylinders or any specific type of cylinder configuration.

Figure 2:
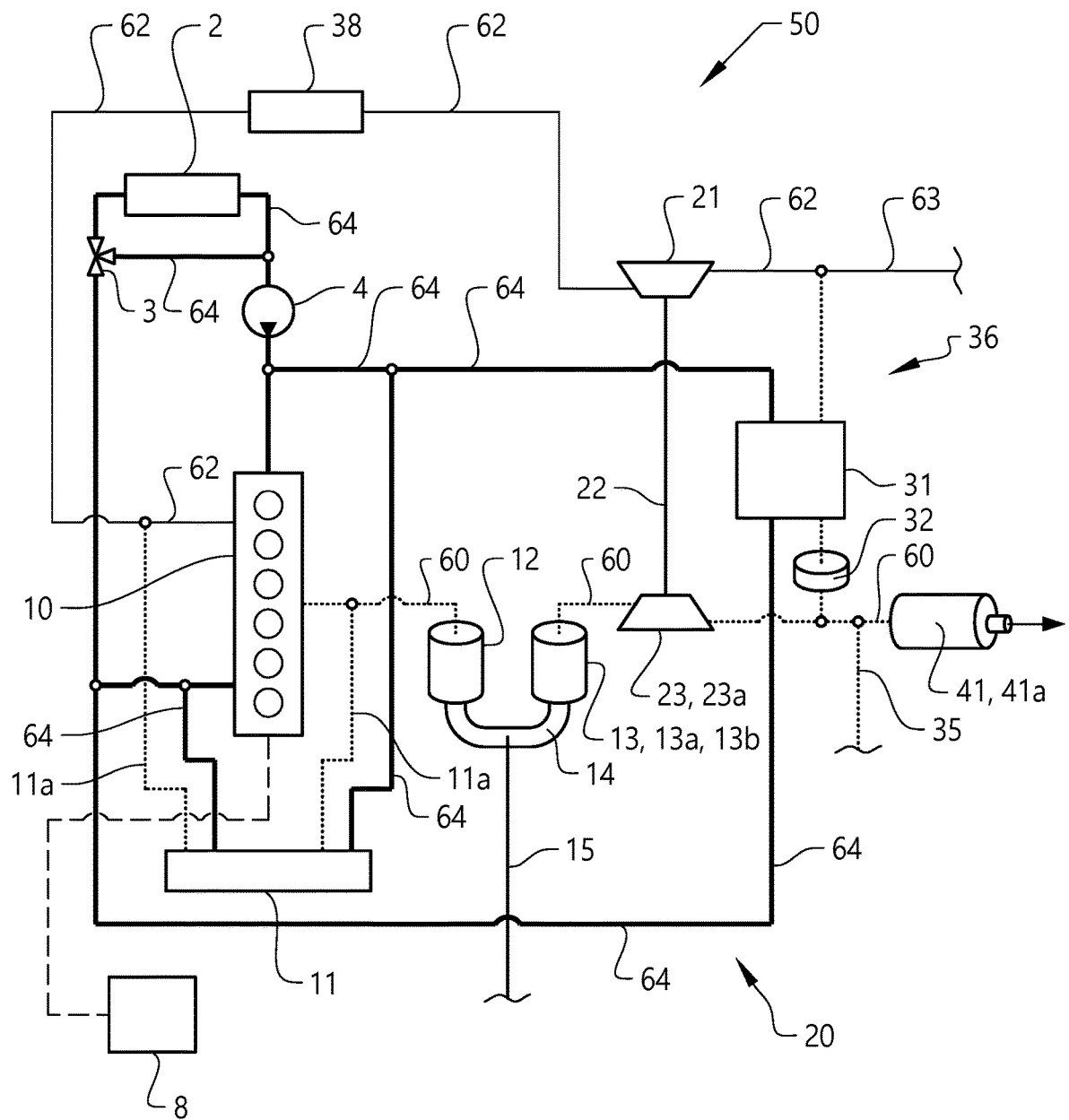
FIG. 2 is a schematic drawing of the hybrid propulsion system in the vehicle in FIG. 1.

Turning now to FIG. 2, there is depicted a first example embodiment of parts of the hybrid propulsion system 50 comprising the internal combustion engine 10 producing exhaust gas and an electric motor 8. The electric motor 8 is operatively connected to the internal combustion engine 10 producing exhaust gas. The electric motor and the engine are operable to power the vehicle. Moreover, the engine is in fluid communication with an exhaust aftertreatment system (EATS) 20 having an exhaust passage 60. The internal combustion engine 10 is configured to provide mechanical power from chemical bounded energy, while the electrical motor is configured to convert electrical energy to/from mechanical energy. Thus, the hybrid propulsion system is configured to provide the combination of mechanical power, delivered by the engine, and electrical power, delivered by the electrical motor, to deliver propulsion power. The vehicle may be a parallel type hybrid or a series type hybrid, which are commonly known in the field of hybrid vehicles.

It should be noted that in the context of the example embodiments, the terms "downstream" and "upstream", as used herein, are terms that indicate a direction relative to the flow of the exhaust gases through the exhaust passage 60. As such, the term "downstream" refers to a direction that generally corresponds to the direction of the flow of exhaust gases, and the term "upstream" generally refers to the direction that is opposite of the direction of flow of the exhaust gases. By way of example, the term "downstream" refers to a direction that generally corresponds to the direction of the flow of exhaust gases from the internal combustion engine 10, and the term "upstream" generally refers to the direction that is opposite of the direction of flow of the exhaust gases from the engine. The direction of flow of the exhaust gases is indicated with arrows in e.g. the FIG. 2, see the exhaust passage 60.

It should be readily appreciated that the EATS 20 of a diesel engine, in particular for a truck, is designed for receiving an exhaust gas. An exhaust aftertreatment system 20, as illustrated herein, typically includes a particulate filter to reduce the level of particulate matter. NOx emission from the engine 10 must also be reduced to comply with regulatory emission standards. Thus, this type of system also comprises a so called SCR module including an SCR catalyst, which is installed along the exhaust passage. The exhaust passage 60 is designed to transport an exhaust gas through the exhaust aftertreatment system.

In the example embodiment of the hybrid propulsion system 50 illustrated in FIG. 2, the EATS 20 comprises a first SCR module 13 and a second SCR module 41. Each one of the SCR module 13 and the second SCR module 41 is disposed in the exhaust passage 60.

Further, the system 50 in FIG. 2 comprises a turbocharger 23. The turbocharger is also disposed in the exhaust passage 60. In particular, the turbocharger 23 is disposed in the exhaust passage and downstream of the first SCR module 13 and upstream of the second SCR module 41. Accordingly, the SCR module 41 is a post-turbo SCR module and the additional SCR module 13 is a pre-turbo SCR module. It is to be noted that the first SCR module 13 and the second SCR module 41 may in the following description of the example embodiment in FIG. 2 be denoted as the first SCR module 13 or the pre-turbo SCR module 13 and as the second SCR module 41 or the post-turbo SCR module 14, respectively. By arranging the first SCR module 13 as a pre-turbo SCR module and the second SCR module 41 as a post-turbo SCR module 41 in relation to the turbocharger in the system 50 allows for an improved process of reducing the NOx emissions, and which can be initiated more rapidly than other available systems. In brief, the turbocharger is adapted to lower the temperature of the exhaust gases passing trough the turbocharger by reducing the level of energy of the exhaust gases. In addition, by arranging the EATS in close connection with the internal combustion engine, in particular, by arranging the pre-turbo SCR module in close connection with the engine, it becomes possible to more rapidly heat the pre-turbo SCR module to its working temperature when the engine is started (or re-started). Further, by arranging the pre-turbo SCR module upstream of the turbine of the turbocharger, it becomes possible to utilize the temperature from the engine prior to the decrease of the temperature of the exhaust gases occurring when the exhaust gases passing through the turbine. Moreover, by arranging the post-turbo SCR module downstream of the turbocharger, it becomes possible to improve the process of reducing the NOx emissions in the exhaust gases, which is particularly useful when the engine is operated at high loads, thus producing exhaust gases with a higher temperature.

Accordingly, the system 50 according to the example embodiment as illustrated in FIG. 2, comprises the turbocharger 23 being disposed in the exhaust passage 60 and downstream of the SCR module 13 and upstream of the additional SCR module 41. The turbocharger 23 comprises the turbine 23a. In this manner, the turbocharger is configured to expand the exhaust gases supplied to the turbine via the exhaust passage 60. In particular, the turbocharger is configured to expand the pressurized exhaust gases supplied to the turbine via the exhaust passage 60 and extract some of the exhaust energy.

As illustrated in FIG. 2, the turbocharger 23 comprising the turbine 23a is operatively connected to a compressor 21 via a turbocharger shaft 22. The turbocharger is a well-known component, and is generally a turbine-driven forced induction device that increases the internal combustion engine's efficiency and power output by forcing extra air into a combustion chamber (illustrated by the circles in the engine 10 in FIG. 2) of the engine. The compressor is thus powered by the turbine via the turbocharger shaft 22. The turbine 23a is driven by the exhaust gas from the engine. The turbine is thus configured to operate the compressor 21 by using the exhaust gases and via the turbocharger shaft 22.

The compressor 21 is disposed in the inlet air passage 62, as further described below.

Each one of the SCR modules 13 and 41 is adapted to carry out a selective catalytic reduction (SCR) for reducing NOx emissions, which will be further described below. Thus, the SCR module 13 comprises an SCR catalyst 13a and the SCR module 41 comprises an SCR catalyst 41a, respectively. By way of example, the SCR catalyst 13a in the pre-turbo SCR module 13 is a CU-zeolite-based catalyst. Also, by way of example, the SCR catalyst in the post-turbo SCR module 41 is a vanadia-based catalyst.

The SCR module 41 can further include a noise reduction muffler and/or a waste heat recovery heat exchanger. In other words, the SCR catalyst 41a is integrated in the noise reduction muffler (not shown). In addition, or alternatively, the SCR catalyst 41a is integrated in the waste heat recovery heat exchanger (not shown).

However, other options for the SCR modules 13 and 41 and the catalysts 13a and 41a are also conceivable. Selective catalytic reduction is a means of converting NOx with the aid of the SCR catalyst into nitrogen (N2) and water (H2O). A reductant, typically aqueous urea, is added to the exhaust gas stream in connection with an SCR module by means of a reductant injector, and converted to ammonia upon hydrolysis, which ammonia may be adsorbed onto the SCR catalyst. Each one of the SCR modules can be provided in the form of an iron- or copper-based zeolite type. In other example embodiments, each one of the SCR modules may be provided in the form of a vanadium-based type.

Control of reductant injection rate at an injector may be based on a reductant dosing model, which may use different parameters as input signals, such as temperature of the exhaust gas entering corresponding SCR module as provided by a temperature sensor. As will be further described below, the system in FIG. 2 comprises a first injector 15 and optionally a second injector 35.

Moreover, in this example embodiment, the EATS 20 of the system 50 comprises a diesel oxygen catalyst (DOC) 12. Also, the EATS 20 of the system 50 comprises a diesel particulate filter (DPF) 13b. In this example embodiment, the pre-turbo SCR module 13 has the SCR catalyst 13a coated on the diesel particulate filter (DPF) 13b.

As depicted in FIG. 2, the DOC 12 is arranged upstream of the pre-turbo SCR module 13.

The EATS also comprises a reductant mixing chamber (RMC) 14, which gives the space/time for evaporating and mixing the reductant. The DOC 12 and the pre-turbo SCR module 13 are in fluid communication with each other via the RMC 14, as illustrated in FIG. 2. In other words, the DOC 12 is arranged upstream of the pre-turbo SCR module 13 and in fluid communication with each other by the RMC 14.

As mentioned above, and as illustrated in FIG. 2, the example embodiment of the exhaust aftertreatment system 20 comprises the first reductant injector 15 for supplying an ammonia-containing reductant, such as urea, to the exhaust gas (i.e. the exhaust passage 60) at a position upstream of the pre-turbo SCR module 13. In particular, the injector 15 for supplying the reductant, to the exhaust gas (i.e. the exhaust passage 60) is configured to supply the reductant to the RMC 14. In other words, the reductant injector is adapted to supply reductant to the RMC 14 at a position upstream of the pre-turbo SCR module 13. In addition, in this type of system, the first reductant injector 15 is controlled to supply a surplus amount of reducing agent to the exhaust passage, an amount which is typically larger than a normal amount of reducing agent being required to be supplied to the pre-turbo SCR module 13 for conversion of NOx emission, which is further described below.

Optionally, the example embodiment of the exhaust aftertreatment system 20 also comprises the second reductant injector 35 for supplying an ammonia-containing reductant, such as urea, to the exhaust gas (i.e. the exhaust passage 60) at a position upstream of the post-turbo SCR module 41 and downstream a low pressure EGR line (branch) 36.

The low pressure EGR line and the injector should be arranged adjacent the turbine outlet. That is, the low pressure EGR line and the injector can be placed so near the turbine outlet as possible to use the turbulence from the turbine outlet as mixing volume or a mixing volume is placed near the catalyst.

In addition, in this type of system, the second reductant injector 35 is controlled to supply an amount of reducing agent to the post-turbo SCR module 41, which is also further described below.

Moreover, as mentioned above, the exhaust aftertreatment system 20 in FIG. 2 comprises the DPF 13b, which is arranged downstream of the first injector 15, while the DOC 12 is arranged upstream of the DPF 13b.

Depending on the type of fuel used, more or less soot and particulate matter is produced. Diesel fuel for example produces more soot and requires thus often a DPF for fulfilling legal emission requirements, whereas fuel such as natural gas or dimethyl ether produces generally small amounts of soot, thereby may eliminating the need of a particulate filter.

In other words, the DOC, sometimes also called the oxidation catalyst, typically is located upstream of the SCR module 13 and upstream of the DPF. The DOC serves to oxidise hydrocarbons and carbon monoxide into carbon dioxide and water. The oxidation catalyst also increases the exhaust temperature.

Turning again to the function of each one of the SCR modules 13 and 41, it is to be noted that each one of SCR modules 13 and 41 is adapted to carry out a selective catalytic reduction (SCR) for reducing NOx emissions. The use of SCR for reducing NOx emissions is widespread within the automotive industry, with the most common technology using urea (NH2CONH2) as a precursor to ammonia (NH3) for the catalytic removal of NOx emissions. In particular, SCR is a means of converting nitrogen oxides, also referred to as NOx with the aid of a catalyst into diatomic nitrogen, N2, and water, H2O. A gaseous reductant, typically anhydrous ammonia, aqueous ammonia or urea, is added to the stream of exhaust gas and is adsorbed onto a catalyst. Carbon dioxide, CO2 is a reaction product when urea is used as the reductant. The invention is not limited to urea as ammonia-containing reductant, but other reductant types currently used in SCR applications may alternatively be used, such as aqueous ammonia.

The NOx reduction reaction takes place as the exhaust gases pass through each one of the SCR catalyst 13a and 41a of the SCR modules 13 and 41, respectively. Before entering an SCR module, the ammonia, or other reductant (such as urea), is injected by the injector, as mentioned above, and mixed with the gases. The chemical equation for a stoichiometric reaction using either anhydrous or aqueous ammonia for a selective catalytic reduction process is:

$$4NO+4NH_3+O_2 \rightarrow 4N_2+6H_2O$$

$$2NO_2+4NH_3+O_2 \rightarrow 3N_2+6H_2O$$

$$NO+NO_2+2NH_3 \rightarrow 2N_2+3H_2O$$

With several secondary reactions:

$$2SO2+O2 \rightarrow 2SO3$$

$$2NH3+SO3+H2O \rightarrow (NH4)2SO4$$

$$NH3+SO3+H2O \rightarrow NH4HSO4$$

$$2NH3+NO+NO2+O2+H2O \rightarrow 2NH4NO3$$

$$4NH3+3O2 \rightarrow 2N2+6H2O$$

$$4NH3+5O2 \rightarrow 4NO+6H2O$$

The reaction for urea instead of either anhydrous or aqueous ammonia is:

$$4NO+2(NH2)2CO+O2 \rightarrow 4N2+4H2O+2CO2$$

Although not explicitly shown in the figures, it is to be noted that each one of the SCR modules 13 and 41 is provided with an inlet for the receiving the exhaust gas and an outlet. The inlet and the outlet correspond to the flow of exhaust gases in the exhaust passage 60.

Regarding the reductant (the reducing agent), it is to be noted that the reductant may be an ammonia-containing reductant, such as urea. The urea is commonly solved in water and is injected by injectors handling liquid.

However, each one of the injectors can either supply a gaseous ammonia-containing reductant or a liquid ammonia-containing reductant, such as aqueous urea. Each one of the gaseous injectors is typically connected to a common or corresponding gaseous ammonia supply device (not shown), which can be implemented in several ways. For example, one or more gas bottles holding pressurized ammonia gas can be provided and coupled to each one of the injectors, such that gaseous ammonia may be injected upstream of each one of the SCR modules (and SCR catalysts) immediately upon a cold-start, or similar conditions.

Replacement and handling of the gas bottles is also relatively easy. According to an alternative embodiment, a storage container may be provided that is configured to store an alkaline earth metal chloride salt, which functions as a source of said gaseous ammonia. The container is preferably heated by electrical wires or the like, thereby facilitating release of gaseous ammonia. Transporting ammonia in a solid storage medium, such as alkaline earth metal chloride salt, results in satisfactory safety and handling of the ammonia source, and only a small amount of heat is required to release the gaseous ammonia. According to yet another alternative, the gaseous ammonia supply device may comprise a storage container holding a solution of ammonia dissolved in a solvent, such as water.

Each one of injectors can be formed by a metal pipe that passes through a side wall of the exhaust passage 60 of the exhaust aftertreatment system 20, and exhibits an discharge opening within the exhaust passage, such that gaseous ammonia from said gaseous ammonia supply device can be supplied to the exhaust gas flow within the exhaust passage by means of the metal pipe.

Further, it is to be noted that when the system 50 is installed and in operation, each one of the SCR modules is capable of receiving NH$_3$ injected into the exhaust aftertreatment system by the injector(s), as mentioned above.

Turning again to the SCR modules, each one of the SCR modules is a honeycomb structure. The honeycomb structure includes a plurality of passages (not shown) for transporting the stream of gas through the SCR module. Although not strictly required, the SCR catalyst in this example is coated onto each one of the wall surfaces of the honeycomb structure, thereby encircling (or defining) the gas passages in the SCR module. The wall surface typically corresponds to inner surfaces of the passages. In other words, the SCR catalyst is arranged so that the active component is capable of chemically interact with the content of the exhaust gas, i.e. the reducing agent. To this end, the SCR catalyst is a part of the honeycomb structure. As mentioned above, the SCR catalyst may for example be a zeolite-based catalyst. Alternatively, the SCR catalyst may be a vanadia-based catalyst.

Regarding the internal combustion engine 10, it is to be noted that the engine, according to an operation of the example embodiments described below, can be operated with a torque restriction. The torque restriction is typically performed by controlling the flow of fuel to the engine by means of a valve member 52, as depicted in FIG. 2. The valve member can be operated e.g. by the control unit 85. The valve member 52 can be any one of several different conventional valves, e.g. a non-return valve, check valve, hydraulic valve, pneumatic valve, electro-magnetic valve etc. The operation of the engine will be described further below in relation to FIG. 3 etc.

Moreover, the hybrid propulsion system 50 optionally, although strictly not necessary, comprises a high pressure exhaust gas recirculation (EGR) function. By way of example, the high pressure exhaust gas recirculation can be provided by an EGR-cooler 11. The EGR-cooler is operatively connected to the exhaust channel 60, as depicted in FIG. 2. In addition, the EGR-cooler 11 is configured to cool exhaust gases from the exhaust passage 60 that may also become blended with air, such as compressed air, from an air inlet passage 62. The EGR-cooler 11 is operatively connected to the cooler 2 so as to receive coolant via coolant channel 64.

Thus, the EGR-cooler 11 for the high pressure EGR is in fluid communication with the exhaust passage 60 and the air inlet passage 62 via a second connection 11a, as illustrated in FIG. 2, or in any other possible way.

By way of example, the high pressure EGR is performed on exhaust gases in the exhaust passage 60 upstream of the DOC 12. In other words, when the system includes the DOC 12, as mentioned above, the high pressure EGR is performed on exhaust gases in the exhaust passage upstream of the DOC 12. Thus the use of high pressure EGR reduces the exhaust flow through the DOC 12 and the SCR catalyst coated DPF 13.

Further, in this example embodiment, the hybrid propulsion system 50 optionally, although strictly not necessary, comprises the low pressure EGR line 36 in fluid communication with the exhaust passage 60 at a position downstream of the turbocharger 23. One purpose with the low pressure EGR is to ensure that the NOx level is on a relatively low level in the EATS, thus enabling a smaller dimensioned SCR module. The low pressure EGR line comprises an EGR cooler 31. Optionally, the EGR line can include an SCR catalyst 32, in the following denoted as the EGR line SCR catalyst 32, especially to allow that the reductant will mainly be injected by the injector 15. The SCR catalyst may include any feature, material and function as mentioned above in relation to the other SCR catalysts 13a and 41a.

In addition, as mentioned above, the hybrid propulsion system as illustrated in FIG. 2 includes the injector 35. The injector 35 is typically configured to supply an additional amount of reducing agent to the exhaust gas in the exhaust passage 60 at a position between the low pressure EGR line 36 and the SCR module 41.

The low pressure EGR line 36 extends between the exhaust passage 60 after the turbine and the air inlet passage 62 before the compressor 21.

Referring again to FIG. 2, the hybrid propulsion system 50 optionally also comprises the air inlet passage 62, as mentioned above. The air inlet passage has an air inlet opening 63 for receiving fresh air to the air inlet passage. The air inlet passage 62 is configured to provide air to the internal combustion engine 10. In the air inlet passage, there is also disposed the compressor 21, as mentioned above, and a charge air cooler 38, as is well-known in the art. The charge air cooler 38 is disposed downstream of the compressor 21, as illustrated in the FIG. 2.

Moreover, the hybrid propulsion system 50 optionally comprises a coolant fluid passage 64. The coolant fluid passage 64 is a closed loop fluid medium circuit for containing and circulating a coolant, such as a fluid medium, e.g. water, air or a gas, or a combination thereof. The coolant fluid passage 64 typically extends from a radiator 2 to various components of the system 50. By way of example, the coolant fluid passage 64 extends from the radiator 2 to a pump unit 4, the engine 10, the EGR cooler for low pressure EGR 31, the EGR cooler for high pressure EGR 11 and to a thermostat 3. In other words, the radiator 2 is in fluid communication with any one of the pump unit 4, the engine 10, the EGR cooler for low pressure EGR 31, the EGR cooler for high pressure EGR 11 and the thermostat 3, as illustrated in FIG. 2. It is also to be noted that each one of these components is disposed in the coolant fluid passage 64, i.e. each one of the radiator 2, the pump unit 4, the engine 10, the EGR cooler for low pressure EGR 31, the EGR cooler for high pressure EGR 11 and the thermostat 3 is disposed in the passage 64.

As such, the radiator 2 is capable of supplying the coolant fluid medium to any one of the pump unit 4, the engine 10, the EGR cooler for low pressure EGR 31, the EGR cooler for high pressure EGR 11 and the thermostat 3. The configuration of cooling these types of components via the radiator and by means of a coolant fluid medium is well-known in the art, and thus not further described herein.

Turning again to the exhaust passage 60 and the transportation of exhaust gases from the engine 10 to the EATS 20, the exhaust gases are typically collected from the cylinders of the engine 10 and introduced into the DOC 12. Subsequently, the exhaust gases passes through the reductant mixing chamber 14. In the RMC 14, a portion of reductant is injected by the injector 15 and mixed so that NOx can be reduced in the SCR module 13 by the SCR catalyst 13a. As mentioned above, the catalyst 13a is coated on the particulate filter. Thereafter, the pressurized exhaust gases are expanded in the turbocharger 23, as mentioned above. The exhaust gases are then directed in the exhaust passage 60 to the post-turbo SCR module 41 having the SCR catalyst 41a. Typically, although not strictly required, the post-turbo SCR module 41 comprises the muffler with noise reduction and an SCR catalyst 41a in form of an ammonia slip catalyst. Optionally, as mentioned above, there is further disposed the low pressure EGR taking exhaust gases downstream the turbocharger 23. The low pressure EGR line can optionally be provided with the SCR catalyst 32 and the cooler 31, as mentioned above.

In this manner, the reductant mixing chamber 14 may necessarily not provide optimal mixing as the turbine in the turbocharger 23 will provides for a so called perfect mix. Further, the SCR coated DPF may hereby not necessarily be dimensioned to reduce NOx emission over the entire working area.

One advantage with the system described in relation to FIG. 2 is that it becomes possible to more rapidly heat the pre-turbo SCR module to its working temperature when the engine is started (or re-started). Further, by arranging the pre-turbo SCR module upstream of the turbine of the turbocharger, it becomes possible to utilize the temperature from the engine prior to the decrease of the temperature of the exhaust gases occurring when the exhaust gases passing through the turbine.

Moreover, by arranging the post-turbo SCR module downstream of the turbocharger, it becomes possible to improve the process of reducing the NOx emissions in the exhaust gases, which is particularly useful when the engine is operated at high loads, thus producing exhaust gases with a higher temperature.

Figure 3A:
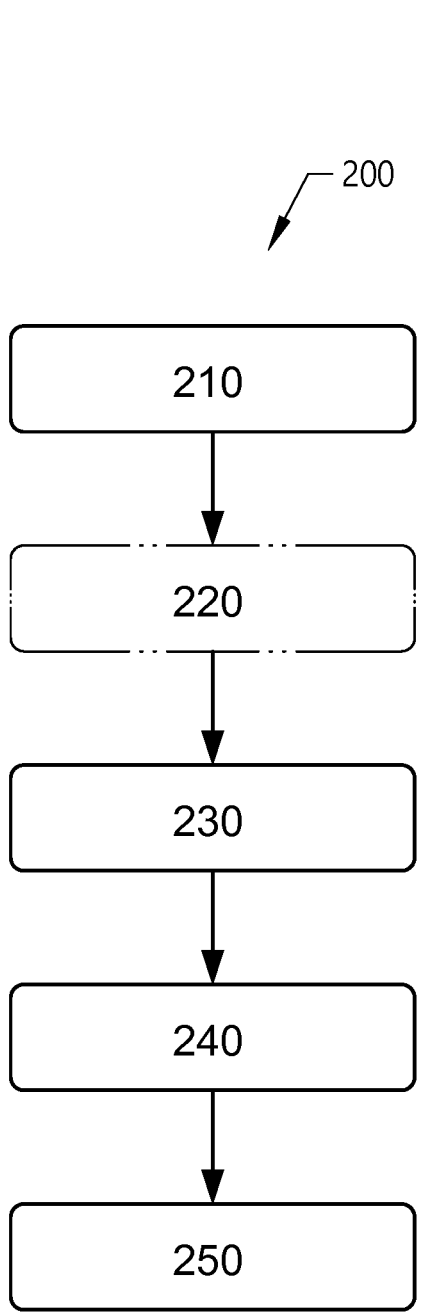
FIG. 3a is a flow-chart of a number of operational steps in a method according to an example embodiment of the present invention.

Turning now to the operation of the hybrid propulsion system 50, one example embodiment of the sequences of a method adapted to operate the hybrid propulsion system according to the present invention is depicted in the flow-chart in FIG. 3a.

The method as will be further described below can operate a system including any one of the example embodiments described above in relation to the FIGS. 1 and 2. In particular, there is provided an example embodiment of a start-up method 200 for heating the selective catalytic reduction SCR module 41 in the hybrid propulsion system 50 of the vehicle 1.

As mentioned above, e.g. in relation to FIGS. 1 and 2, the system 50 comprises the internal combustion engine 10 producing exhaust gas and the electric motor 8. The electric motor is operatively connected to the internal combustion engine producing exhaust gas. The electric motor and the internal combustion engine are operable to power the vehicle. The engine is also in fluid communication with the exhaust aftertreatment system (EATS) 20. Further, in this example, the EATS 20 comprises the exhaust passage 60 and the SCR module 13, while the SCR module 13 being disposed in the exhaust passage 60 downstream of the engine 10 and the electric motor 8.

In order to operate this type of system, the method comprises the steps of:

operating 210 the engine in a start-up mode with a torque restriction on the engine, allowing the SCR module 13 to convert NOx emission;

supplying 230 a surplus amount of a reducing agent to the exhaust gas at a position between the engine 10 and the SCR module 13, the surplus amount of the reducing agent being larger than a required amount of reducing agent for converting NOx emission from the engine;

heating 240 the SCR module 13 to a working temperature T1;

terminating 250 the start-up mode, thereby terminating the torque restriction on the engine and the supply of the surplus amount of the reducing agent.

The step of terminating the start-up mode may include one or several additional steps depending on type of system, type of vehicle and type of installation. By way of example, the step of terminating the start-up mode is performed by changing from supplying the surplus amount of the reducing agent to the required amount of reducing agent for converting NOx emission from the engine. That is, the surplus amount of the reducing agent supplied in step 230 is typically larger than an amount of reducing agent supplied to the SCR module 13 in an EATS including only one SCR module. In particular, the surplus amount of the reducing agent supplied in step 230 is typically larger than a normal amount of reducing agent supplied to the SCR module for converting NOx emission from the engine during normal operation of the engine. In this context, the term normal amount of reducing agent generally refers to an amount of reducing agent being sufficient for converting NOx emission. That is, the number of NH3 supplied to the SCR module by the injector essentially equals the number of NOx, referring to the chemical formulas as mentioned above.

It is to be noted that the SCR module 13 and the SCR module 41 can be operated in various manner and operated to convert NOx emission at various magnitudes. By way of example only, when the engine is operated in the start-up mode, the SCR module 13 is operated to convert more than 95% of the NOx emission. Preferably, the SCR module 13 is operated to convert more than 98% of the NOx emission. Still preferably, the SCR module 13 is operated to convert more than 99% of the NOx emission.

Typically, the step of operating 210 the engine with the torque restriction is performed by controlling the flow of fuel to the engine. This may be performed by means of a valve member (not shown). The valve member can be operated e.g. by the control unit 85.

In some occasions, the engine of the vehicle may not provide enough power for operate the vehicle in an appropriate manner, e.g. when the vehicle is a heavy weight vehicle and engine is operated in an uphill terrain or being subject to high acceleration demands.

In these types of occasions, the step 210 of operating the engine with the torque restriction, as mentioned above, comprises the additional step of providing additional power by the electric motor 8, if the amount of power from the engine operated with the torque restriction is less than the required amount of power for operating the vehicle. Typically, this is indicated by that the vehicle is operated by a lower speed than a desired speed at the given occasion, thus requesting further power.

As indicated in the flow-chart in FIG. 3a by the box 220 in dashed lines, the method optionally comprises the step 220 of performing a high pressure exhaust gas recirculation EGR of exhaust gases transported in the exhaust passage downstream of the engine 10. In addition, in this variant of the method, the step 250 thus further comprises terminating the high pressure EGR. It is to be noted that this step is only optional, and not strictly required. By way of example, the high pressure EGR is used to maintain a low level of exhaust gases through the EATS 20, while contributing to maintaining a low level of concentration of NOx. It is to be noted that also other ways of maintaining a low level of exhaust gases through the EATS 20 are possible, e.g. by deactivation of one or several cylinders.

In the variant when the method includes the optional step 220, the step 250 of terminating the start-up mode generally further comprises the step 252 of switching from the high pressure EGR to a low pressure EGR, while changing from supplying the surplus amount of the reducing agent to the required amount of reducing agent for converting NOx emission from the engine.

The operational step 252 can be performed in several different ways depending on type of system, type of vehicle and type of implementation. By way of example, the step 252 of switching from the high pressure EGR to the low pressure EGR is performed by directing at least a portion of exhaust gases in the exhaust passage 60 via the low pressure EGR 31.

Regarding the step 230, it is to be noted that this step is typically performed by an injector, as mentioned above. In particular, the step 230 of supplying the surplus amount of the reducing agent to the exhaust gas at the position between the engine 10 and the SCR module 13 is performed by an injector 15. The injector may also be controlled by the control unit 85, or in any other conceivable manner depending on type of engine, vehicle and installation.

Regarding the step 240, it is to be noted that the working temperature T1 may correspond to a temperature of about 170-500 degrees Celsius, still preferably the working temperature T1 may correspond to a temperature of about 170-400 degrees, still preferably the working temperature T1 may correspond to a temperature of about 250-400 degrees Celsius. Also, in some example embodiments, the working temperature T1 may correspond to a temperature of about 250-500 degrees Celsius.

Thus, the step of heating 240 the SCR module 13 to the working temperature T1, may include the step of heating the SCR module 13 to about 170-500 degrees Celsius.

Further, the step 240 optionally includes the step of heating the SCR module 41 to a corresponding working temperature. By way of example, the step 240 includes the step of heating the SCR module 41 to about 170-500 degrees Celsius. It is to be noted that the working temperature of the SCR module 41 may correspond to a temperature of about 170-500 degrees Celsius, still preferably the working temperature of the SCR module 41 may correspond to a temperature of about 170-400 degrees, still preferably the working temperature of the SCR module 41 may correspond to a temperature of about 250-400 degrees Celsius. Also, in some example embodiments, the working temperature of the SCR module 41 may correspond to a temperature of about 250-500 degrees Celsius.

The working temperature of the SCR module 13 and the working temperature of the SCR module 41 may be equal or may differ depending on type of system and type of vehicle.

Thus, the step of heating the SCR module 41 to the working temperature T1, may include the step of heating the SCR module 41 to about 170-500 degrees Celsius, or to any other one of the ranges mentioned above.

Accordingly, the step 240 in this example optionally includes the step of heating the SCR module 41 to a working temperature T2.

As mentioned above, the EATS 20 comprises the diesel oxygen catalyst DOC 12 and the SCR module 13 having the SCR catalyst 13a coated on the diesel particulate filter DPF 13b. Further, the DOC 12 is typically arranged upstream of the SCR module 13 and in fluid communication with each other by a reductant mixing chamber RMC 14. One example of an EATS including these components is described above in relation to FIG. 2. In a system including the SCR module 13, the surplus amount of the reducing agent supplied in step 230 is typically larger than a normal amount of reducing agent supplied to the SCR module 13.

Further, as mentioned above, the system 50 in at least one example embodiment comprises the turbocharger 23 disposed in the exhaust passage and downstream of the additional SCR module 13 and upstream of the SCR module 41. Accordingly, the SCR module 41 is a post-turbo SCR module and the SCR module 13 is a pre-turbo SCR module.

By way of example, the SCR catalyst 13a in the pre-turbo SCR module is a CU-zeolite-based catalyst. Also, by way of example, a SCR catalyst in the post-turbo SCR module is a vanadia-based catalyst.

Figure 3B:
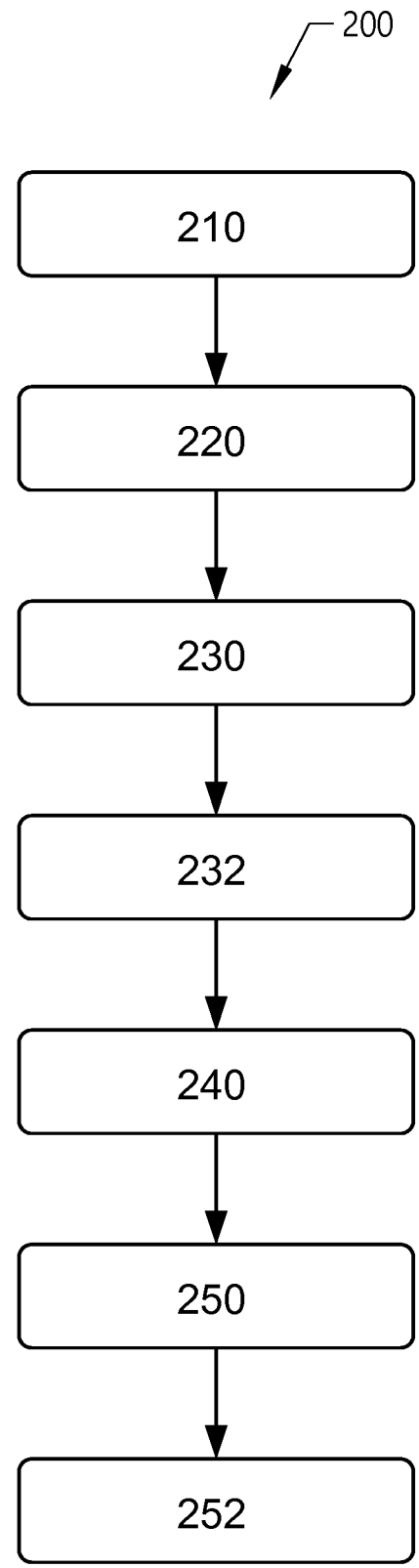
FIG. 3b is another flow-chart of a number of operational steps in a method according to another example embodiment of the present invention.

Turning now to the example embodiment of the method described in relation to FIG. 3b, in which the method additionally comprises the step 220 of performing a high pressure exhaust gas recirculation EGR of exhaust gases transported in the exhaust passage downstream of the engine, the method optionally also includes the step of performing the high pressure EGR on exhaust gases in the exhaust passage upstream of the DOC 12. In other words, when the system includes the DOC 12, as mentioned above, the step 220 of performing the high pressure EGR is performed on exhaust gases in the exhaust passage upstream of the DOC 12.

Moreover, as mentioned above, when the EATS 20 comprises the low pressure EGR line 36 in fluid communication with the exhaust passage 60 at a position downstream of the turbocharger, the low pressure EGR line comprises the EGR cooler 31 and optionally the EGR line SCR catalyst 32. In this type of variant of the EATS 20, the method optionally also comprises the step 232 of supplying an additional amount of reducing agent to the exhaust gas in the exhaust passage 60 at a position between the low pressure EGR line 36 and the SCR module 41 by the additional injector 35, which is illustrated in the method in FIG. 3*b*.

While the method (and the corresponding steps and sequences) described above in relation to FIGS. 3*a* and 3*b* is particularly suitable for a hybrid propulsion system comprising a first SCR catalyst, a second SCR catalyst and a turbocharger arranged in-between, the method may likewise be useful in a hybrid propulsion system comprising one SCR catalyst, only. One example of this type of system is illustrated in FIG. 4.

Figure 4:
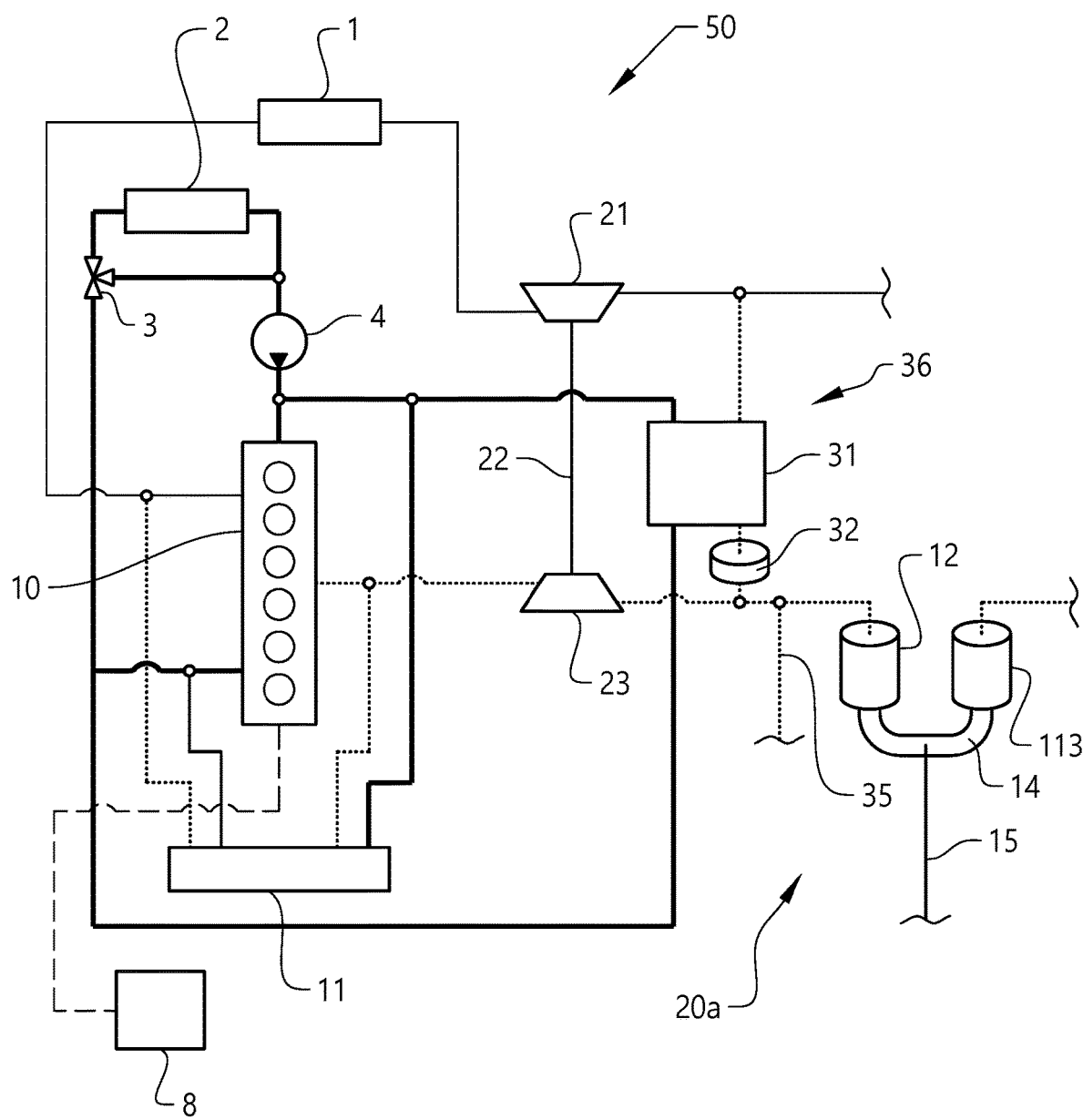
FIG. 4 is a schematic drawing of another hybrid propulsion system adapted to be operated according to a method of an example embodiment of the present invention.

In brief, the system in FIG. 4 optionally comprises any one of the features, functions, examples and/or effects as described in relation to FIG. 2 except the arrangement of pre-turbo SCR module. In addition, the post-turbo SCR module 113 now includes similar components as the previous pre-turbo SCR module (denoted with reference numeral 13 in FIG. 2). That is, in FIG. 4, the post-turbo SCR module 113 includes an SCR catalyst 113*a* coated on the diesel particulate filter DPF 113*b*. In addition, the diesel oxygen catalyst DOC 12 is arranged upstream of the SCR module 113 having the SCR catalyst coated on the DPF 13*b*. Further, the DOC 12 is typically arranged in-between the turbocharger 23 and the SCR module 113. Thus, the DOC is arranged downstream of the turbocharger. In this example, the SCR module 113 is in fluid communication with the RMC 14. Moreover, in this example, the surplus amount of the reducing agent supplied to the post-turbo SCR module 113 by the injector 15.

In order to operate this type of system, the method comprises the steps of:
operating 210 the engine in a start-up mode with a torque restriction on the engine, allowing the SCR module 113 to convert NOx emission;
supplying 230 a surplus amount of a reducing agent to the exhaust gas at a position between the engine 10 and the SCR module 113, the surplus amount of the reducing agent being larger than a required amount of reducing agent for converting NOx emission from the engine;
heating 240 the SCR module 113 to a working temperature T1;
terminating 250 the start-up mode, thereby terminating the torque restriction on the engine and the supply of the surplus amount of the reducing agent.

The method may also include any one of the other features and steps as described in relation to FIGS. 3*a* and 3*b*, except that the method in relation to FIG. 4 operates an EATS with the SCR module 113. It should be readily appreciated that the details of the system in FIG. 4 as well as the individual features of the system are essentially the same as those described in relation to FIGS. 1 and 2 above, unless explicitly stated above.

Figure 5:
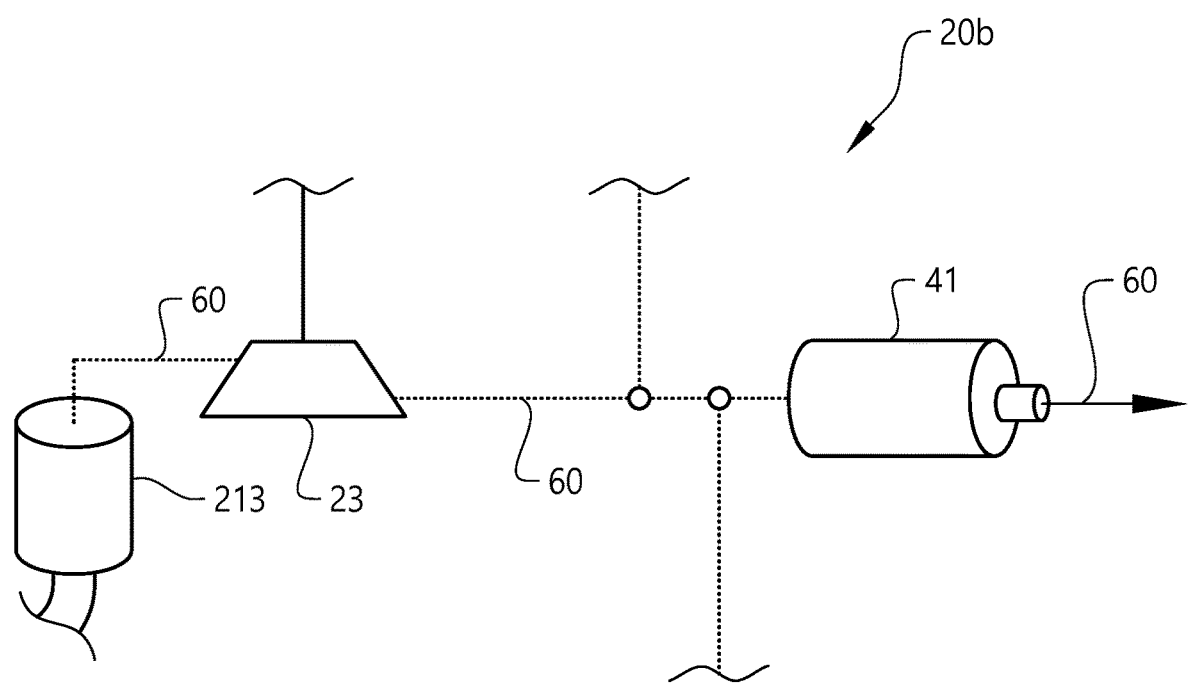
FIG. 5 is a schematic drawing of another hybrid propulsion system according to an example embodiment of the present invention, and which can be adapted to be operated according to a method of an example embodiment of the present invention.

Turning now to FIG. 5, there is depicted another example embodiment of an EATS for a vehicle according to the present invention. The EATS 20*b* in FIG. 5 may include any feature, example and function as described in relation to the system in FIG. 2 as long as there is no contradiction between the system in FIG. 5 and the system in FIG. 2. The EATS 20*b* described in relation to FIG. 5 can be included in the hybrid propulsion system of a vehicle, as described in relation to FIGS. 1 and 2, or in any other type of hybrid propulsion system. In particular, the EATS 20*b* described in relation to FIG. 5 comprises the turbine 23*a* disposed in an exhaust passage 60; a pre-turbo selective catalytic reduction SCR module 13 comprising a CU-zeolite-based catalyst, and being arranged upstream of the turbocharger in the exhaust passage; and a post-turbo SCR module 41 comprising a vanadia-based catalyst.

The post-turbo SCR module 41 comprising the vanadia-based catalyst is arranged downstream of the turbine 23*a* in the exhaust passage 60.

In this manner, the turbine 13 is arranged to reduce exhaust energy in the exhaust passage. The turbine is connected to a compressor, a turbocharger (as in FIG. 2), but may as well be connected to the crankshaft (not shown) or to an electric generator (not shown) for use in the propulsion system 50.

In brief, the turbocharger is, as mentioned above, adapted to lower the temperature of the exhaust gases passing trough the turbocharger by reducing the level of energy of the exhaust gases.

In addition, by arranging the EATS in close connection with the internal combustion engine, in particular, by arranging the pre-turbo SCR module in close connection with the engine, it becomes possible to more rapidly heat the pre-turbo SCR module to its working temperature when the engine is started (or re-started). Further, by arranging the pre-turbo SCR module upstream of the turbine of the turbocharger, it becomes possible to utilize the temperature from the engine prior to the decrease of the temperature of the exhaust gases occurring when the exhaust gases passing through the turbine.

Moreover, by arranging the post-turbo SCR module downstream of the turbocharger, it becomes possible to improve the process of reducing the NOx emissions in the exhaust gases, which is particularly useful when the engine is operated at high loads, thus producing exhaust gases with a higher temperature.

As mentioned above, the CU-zeolite-based catalyst of the pre-turbo SCR module 13 is coated on a diesel particulate filter DPF 13*b*. By way of example, The CU-zeolite based catalyst is generally in form of either CHA, SSZ13, SSZ45, SAPO, LTA or the like, with Cu or CU and Fe as cations.

In addition, it is to be noted that the main enthalpy reduction is in form of exhaust temperature. Further, the temperature reduction is typically increasing with increasing temperature.

It should be readily appreciated that the details of the system in FIG. 5 as well as the individual features of the system are essentially the same as those described in relation to FIGS. 1 and 2 above, unless explicitly stated above. Also, the system as described in relation to FIG. 5 can be operated according to any one of example embodiments of the methods described in relation to FIGS. 3*a* and 3*b*. Thus, in order to operate this type of system, the method comprises the steps of:

operating 210 the engine in a start-up mode with a torque restriction on the engine, allowing the SCR module 213 to convert NOx emission;

supplying 230 a surplus amount of a reducing agent to the exhaust gas at a position between the engine 10 and the SCR module 213, the surplus amount of the reducing agent being larger than a required amount of reducing agent for converting NOx emission from the engine;

heating 240 the SCR module 13 to a working temperature T1 and the SCR module 41 to a working temperature T2;

terminating 250 the start-up mode, thereby terminating the torque restriction on the engine and the supply of the surplus amount of the reducing agent.

The method according to the example embodiments, as described above in relation to the FIGS. 3a and 3b, and any other example embodiments, is typically controlled by the control unit 85. Thus, the hybrid propulsion system comprises the control unit 85 for controlling the system according to the various method steps as described herein. In particular, the control unit 85 is configured to perform any one of the steps of the method according to any one of example embodiments as described above.

The example embodiments of the invention also relate to the vehicle comprising the hybrid propulsion system 50 and the control unit 85. Further, it is to be noted that any one of the example embodiments of the present invention may include a computer program comprising program code means for performing the method steps of the present invention, as described above, when the program is run on a computer. Accordingly, any one of the example embodiments of the present invention may be provided with a computer readable medium carrying a computer program comprising program code means for performing the method steps of the present invention, as described above, when the program product is run on a computer.

Thanks to the present invention, there is provided a number of methods and systems for an improved NOx emissions control due to a quicker and more efficient process of reducing the NOx emission in the EATS of a hybrid propulsion system of a vehicle.

It is to be understood that the present invention is not limited to the embodiments described above and illustrated in the drawings; rather, the skilled person will recognize that many changes and modifications may be made within the scope of the appended claims.

For example, the step of reducing the exhaust flow by high pressure EGR can be complemented with the use of a throttle or by deactivating one or several engine cylinders. It is even possible that step of reducing the exhaust flow by high pressure EGR can be exchanged with the use of a throttle or by deactivating one or several engine cylinders.

By way of example, the method of the example embodiments can further operate a hybrid propulsion system as described in relation to FIG. 2, except that the DOC 12, the RCM 14, the injector 15, the SCR module 13, the SCR catalyst 13a and the DPF 13b are disposed downstream of the turbocharger including the turbine 23, 23a. In addition, in this type of system the DPF 13b is a separate component in fluid communication with the SCR module comprising the SCR catalyst 13a.

The invention claimed is:

1. A start-up method for heating a selective catalytic reduction (SCR) module in a hybrid propulsion system of a vehicle, said system comprising an electric motor operatively connected to an internal combustion engine producing exhaust gas, said electric motor and said internal combustion engine being operable to power said vehicle, and said internal combustion engine being in fluid communication with an exhaust aftertreatment system (EATS) having an exhaust passage and comprising the SCR module, said SCR module being disposed in said exhaust passage downstream of said engine and said electric motor, comprising the steps of: operating the engine in a start-up mode with a torque restriction on the engine, allowing the SCR module to convert NOx emission; performing a high pressure exhaust gas recirculation (EGR) of exhaust gases transported in the exhaust passage downstream of the engine, while further comprising terminating the high pressure EGR; supplying a surplus amount of a reducing agent to the exhaust gas at a position between the engine and the SCR module, the surplus amount of the reducing agent being larger than a required amount of reducing agent for converting the NOx emission from the engine; heating said SCR module to a working temperature; terminating the start-up mode including switching from said high pressure EGR to a low pressure EGR, while changing from supplying the surplus amount of the reducing agent to the required amount of reducing agent for converting NOx emission from the engine, thereby terminating the torque restriction on the engine and the supply of the surplus amount of the reducing agent.

2. Method according to claim 1, further comprising switching from said high pressure EGR to said low pressure EGR is performed by directing at least a portion of exhaust gases in said exhaust passage via said low pressure EGR.

3. Method according to claim 1, further comprising operating the engine with the torque restriction comprises the step of providing additional power by the electric motor if the amount of power from the engine operated with the torque restriction is less than the required amount of power for operating the vehicle.

4. Method according to claim 1, further comprising operating the engine with the torque restriction is performed by controlling a flow of fuel to the engine.

5. Method according to claim 1, wherein, when said engine is operated in the start-up mode, the SCR module is operated to convert more than 95% of the NOx emission.

6. Method according to claim 1, wherein said EATS comprises a diesel oxygen catalyst (DOC) and said SCR module having an SCR catalyst coated on a diesel particulate filter, said DOC being arranged upstream of said SCR module and in fluid communication with each other by a reductant mixing chamber.

7. Method according to claim 6, further comprising performing the high pressure EGR is performed on exhaust gases in the exhaust passage upstream of said DOC.

8. Method according to claim 1, wherein the system further comprises a turbocharger disposed in said exhaust passage and downstream of said SCR module and upstream of an additional SCR module, thereby said SCR module is a pre-turbo SCR module and said additional SCR module is a post-turbo SCR module.

9. Method according to claim 8, further comprising heating the post-turbo SCR module to a corresponding working temperature.

10. Method according to claim 8, wherein an SCR catalyst in the pre-turbo SCR module is a CU-zeolite-based catalyst and an SCR catalyst in the post-turbo SCR module is a vanadia-based catalyst.

11. Method according to claim 8, wherein the EATS comprising a low pressure EGR line in fluid communication with the exhaust passage at a position downstream of said turbocharger, said low pressure EGR line comprises an EGR cooler and an EGR line SCR catalyst.

12. Method according to claim 11, further comprising the step of supplying an additional amount of reducing agent to the exhaust gas in the exhaust passage at a position between said low pressure EGR line and said post-turbo SCR module.

13. A computer program comprising program code means for performing the steps of claim 1 when said program is run on a computer.

14. A non-transitory computer readable medium carrying a computer program comprising program code for performing the steps of claim 1 when said program code is run on a computer.

* * * * *